US006170347B1

United States Patent
Kim

(10) Patent No.: US 6,170,347 B1
(45) Date of Patent: Jan. 9, 2001

(54) NEUTRAL RETURNING CONTROL SYSTEM AND METHOD FOR ELECTRONIC PNEUMATIC SHIFT DEVICE

(75) Inventor: Hyong-Jin Kim, Kyungki-do (KR)

(73) Assignee: Hyundai Motor Company, Seoul (KR)

( * ) Notice: Under 35 U.S.C. 154(b), the term of this patent shall be extended for 0 days.

(21) Appl. No.: 09/452,807

(22) Filed: Dec. 2, 1999

(30) Foreign Application Priority Data

Jul. 28, 1999 (KR) .................................. 99-30852

(51) Int. Cl.⁷ .................................................. F16H 59/00
(52) U.S. Cl. ............................................................ 74/335
(58) Field of Search ................................................ 74/335

(56) References Cited

U.S. PATENT DOCUMENTS 4,718,307 * 1/1988 Yabe et al. .............................. 74/335
5,778,330 * 7/1998 McKee .................................. 74/335

FOREIGN PATENT DOCUMENTS

3422056 A1 * 12/1985 (DE) ...................................... 74/335

* cited by examiner

Primary Examiner—Dirk Wright

(57) ABSTRACT

A neutral returning control system and method for electronic pneumatic shift device adapted to return a striker by way of manipulating an emergency neutral return switch when the striker deviates from a normal shifting position during activation of a shifting operation, the electronic pneumatic shift device including a change lever position sensor for detecting a manipulation of a change lever, a magnetic valve assembly for controllably supplying air according to a signal from the change lever position sensor, a gear shift device actuated by the air supplied via an air pipe connected to the magnetic valve assembly, a shift stage position sensor disposed at one side for detecting an operation of the gear shift device, and an electronic control device for discriminating electrical signals from the shift state position sensor and change lever position sensor and for controlling the magnetic valve assembly, wherein the system comprises an emergency neutral return switch electrically mounted from allowing the electronic control device to discriminate the turn-on manipulation by a driver when there occurs an erroneous shifting.

8 Claims, 3 Drawing Sheets

NEUTRAL RETURNING CONTROL SYSTEM AND METHOD FOR ELECTRONIC PNEUMATIC SHIFT DEVICE

BACKGROUND OF THE INVENTION

1. Field of the Invention

The present invention relates to a neutral returning control system and method for electronic pneumatic shift device, and more particularly to a neutral returning control system and method for electronic pneumatic shift device adapted to return a striker by way of manipulating an emergency neutral return switch when the striker deviates from a normal shift position during activation of a gear shift device.

2. Description of the Prior Art

Generally, a transmission gear box is situated in a far place from a driver in rear engine driving vehicles and other large vehicles such as truck, bus, such that a shift device is needed for accurately transmitting manipulation of a clutch and a change lever and for smooth shifting. The latest trend is to replace the current hydraulic or mechanical shift device with a pneumatic one. The pneumatic shift device serves to control air pressure electronically to change meshing of gear.

FIG. 1 is a schematic diagram for illustrating an electronic pneumatic shift device applied to the present invention, where the electronic pneumatic shift device 2 receives an electric signal from a change lever position sensor 6 by sensing manipulation of a change lever (4L) to cause an electronic control device 8 to open and close a magnetic valve assembly 10, such that air is supplied to or discharged from a gear shift device 12 to allow a transmission 14 to perform a shifting. The magnetic valve assembly 10 is connected to an air tank 15 to receive the supply of air. The supply and discharge from the air tank 15 via a repulsive valve 18 which is a 3-way magnetic valve connected to a repulsive cylinder (not shown) makes a driver feel a shifting feel when a shifting is accomplished by manipulation of the change lever (4L).

The electronic control device 8 connects a shift display 20 for detecting and displaying a manipulation signal from the change lever (4L), to a warning lamp 24 for advising and detecting a failure of shifting realized by air supply from the magnetic valve assembly 10 via a shift stage position sensor 22 or for detecting an erroneous operation of the change lever (4L). The gear shaft device 12 is so connected as to supply air to a cylinder MVA 26 and another cylinder MVB 28 by way of the magnetic valve assembly 10 operated by a signal from the electronic control device 8 or discharge the air to the atmosphere.

When the air is controllably supplied to the cylinder MVA 26 or another cylinder MVB 28 by way of actuation of the magnetic valve assembly 10, a shift rod 30 is moved to one direction. By this operation, a striker 32 at the shift rod 30 is so moved leftward that a shifting is realized from a neutral stage of neutral position to a first, third or fifth stage, or so moved rightward that the shifting is initiated to a second, fourth or reverse stage.

That is, when a driver manipulates the change lever (4L), the electronic control device 8 controls the magnetic valve assembly 10 to thereby control the supply and discharge of air to the cylinders MVA 26 and MVB 28 at the gear shift device 12, such that the striker 32 is moved to perform the shifting.

However, there is a problem in the prior art in that a striker at a gear shift device stops at a, b positions which are not the normal shifting positions when air pressure supplied to the cylinders MVA and MVB at the gear shift device is insufficient due to sudden breakage, supply and discharge of air to and from the cylinders MVA and MVB are not smooth due to sudden manipulation of a clutch pedal and when synchronizing force lacks during shifting operation due to abrasion of a transmission synchronizer.

There is another problem in that a driver should stop driving a vehicle and detach an upper cover of the gear shift for maintenance when the striker is not operated at a normal position while the vehicle is running, thereby making it impossible for the striker to return to a neutral position, such that passengers experience inconvenience and technical credibility of the product is decreased.

SUMMARY OF THE INVENTION

The present invention is disclosed to solve the aforementioned problems and it is an object of the present invention to provide a neutral positioning control system and method for electronic pneumatic shift device adapted to return a striker by way of manipulating an emergency neutral return switch when the striker deviates from a normal shifting position during activation of a gear shift device.

In accordance with the object of the present invention, there is provided a neutral positioning control system and method for electronic pneumatic shifting device, the system comprising:

a gear shift device for controlling a magnetic valve assembly connected to an air pipe for shifting;

an emergency neutral return switch for detecting a shifting operation of the gear shift device via a position sensor and being manipulated by a driver recognizing an erroneous operation in shifting; and an electronic control device for discriminating an operation of the emergency neutral return switch to control a magnetic valve assembly.

In accordance with another object of the present invention, there is provided a neutral positioning control method for electronic pneumatic shifting device, the method comprising the steps of:

detecting that an emergency neutral return switch is turned on while a vehicle is running;

discriminating a normal position of a striker at a gear shift device by way of a position sensor;

sending a command that air is alternatively supplied to a cylinder MVA and another cylinder MVB at the gear shift device for 5 seconds each 10 times and is simultaneously supplied to the cylinder MVA and another cylinder MVB for one second; and discriminating a neutral position of the striker at the gear shift device by way of the position sensor.

A driver can manipulate the emergency neutral return switch who has recognized through a shift display or a feeling that shifting had not been initiated by a change lever while a vehicle is running. A striker can be positioned at a neutral position by controlling a magnetic valve assembly to alternatively supply air to the cylinders MVA and MVB at the gear shift device or to simultaneously supply air thereto for shock, when it is found out by an electronic control device via a position sensor that the shifting has not been normally performed by the gear shift device.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Construction and operation of the preferred embodiment according to the present invention will now be described in detail with reference to the accompanying drawings.

Figure 1:
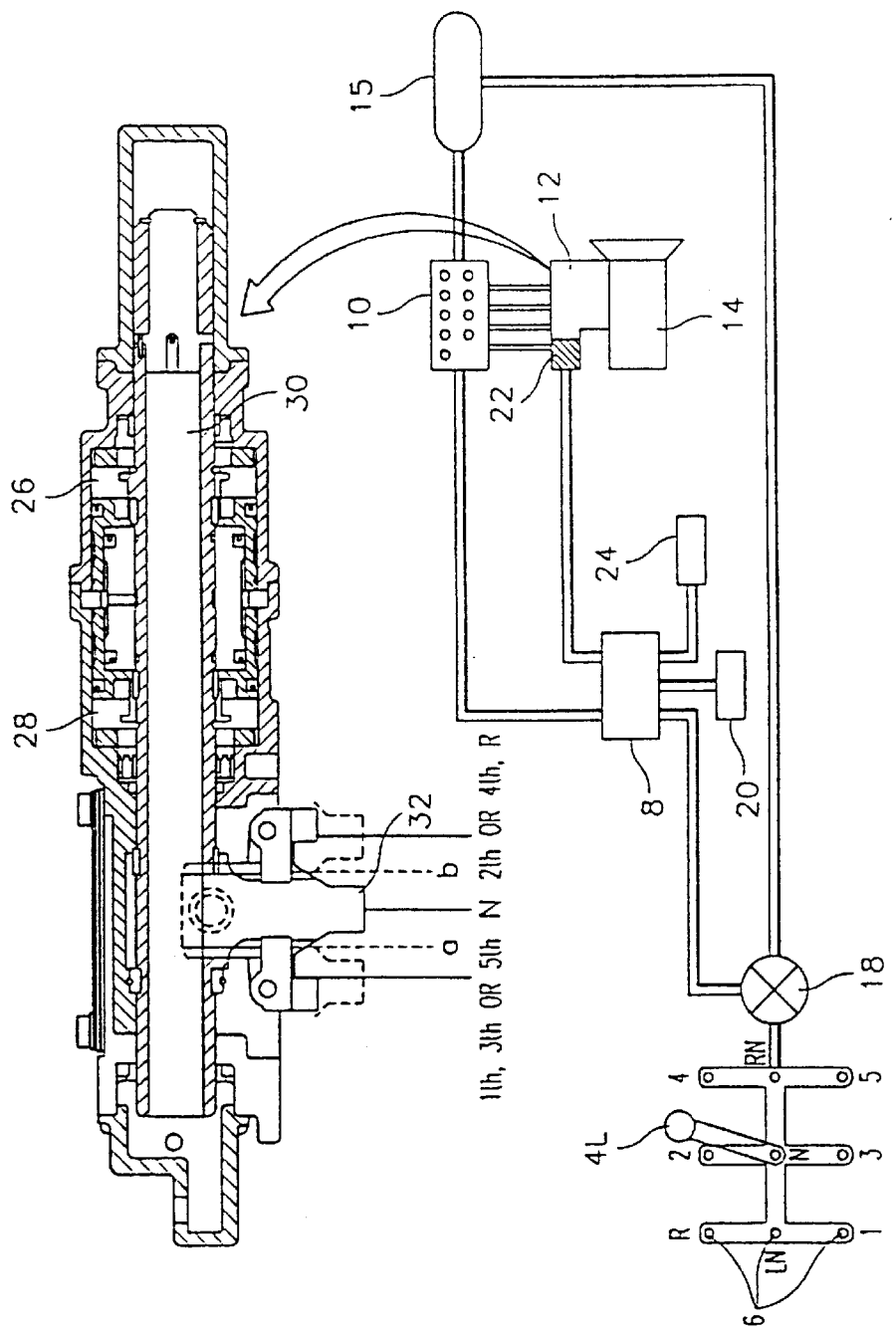
FIG. 1 is a schematic diagram for illustrating a structure of an electronic pneumatic shift device according to the present invention.
Figure 2:
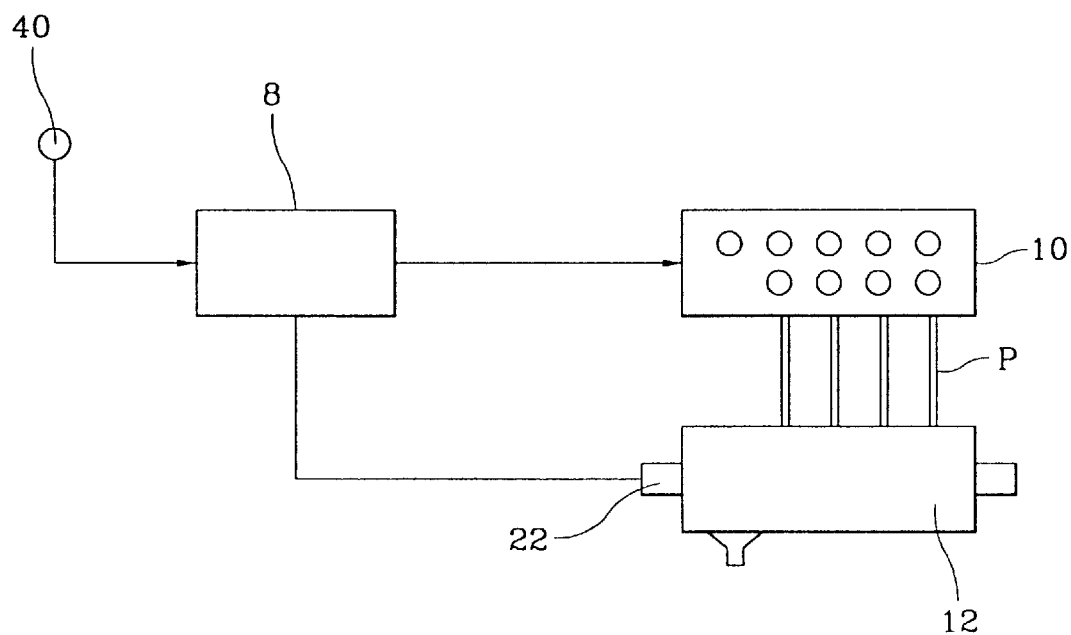
FIG. 2 is a control block diagram of an electronic pneumatic shift device according to the present invention.
Figure 3:
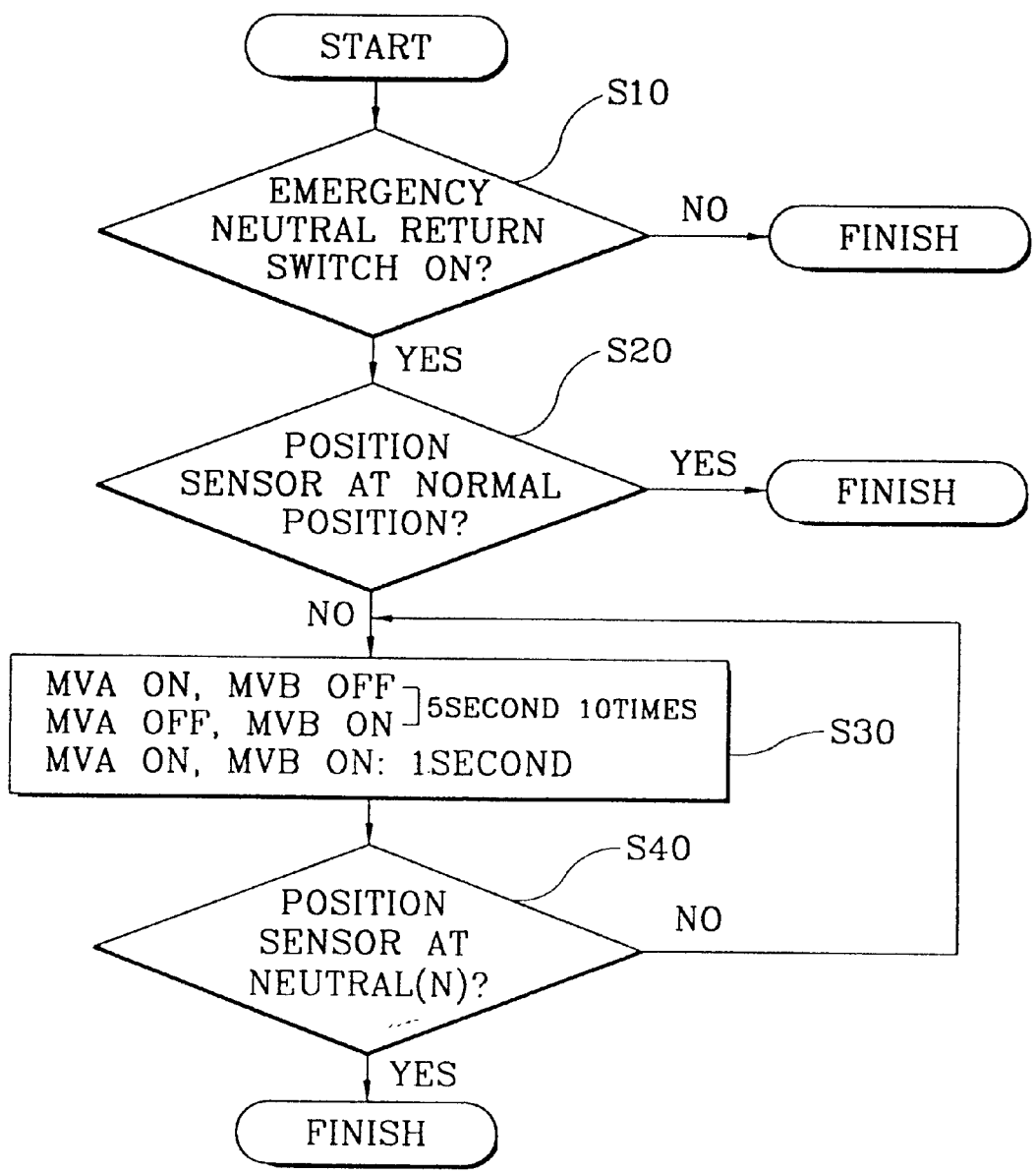
FIG. 3 is a flow chart for illustrating an emergency neutral return control method of an electronic pneumatic shift device according to the present invention.

FIG. 1 is a schematic diagram for illustrating a structure of an electronic pneumatic shift device according to the present invention, FIG. 2 is a control block diagram of an electronic pneumatic shift device according to the present invention and FIG. 3 is a flow chart for illustrating an emergency neutral return control method of an electronic pneumatic transmission according to the present invention.

An electronic pneumatic shift device 2 is mounted with an emergency neutral return switch 40 for a driver to manipulate and is electrically connected to an electronic control device 8 for detecting the manipulation.

The electronic pneumatic shift device 2 operates a gear shift device 12 by controlling a magnetic valve assembly 10 connected to an air pipe (P) and detects the shifting operation of the gear shift device 12 through a position sensor 22, where the electronic pneumatic shift device 2 includes an emergency neutral return switch 40 manipulated by a driver who discriminates an erroneous operation of the shifting, and an electronic control device 8 for discriminating actuation of the emergency neutral return switch 40 to control a magnetic valve assembly 10.

Now, operation of the present invention thus constructed will be described.

When a shifting is not performed by a change lever (4L) while a vehicle is 25 running, a driver who has recognized by way of a shift stage display 20 or by a feeling manipulates the emergency neutral return switch 40, step S10.

The manipulation of the emergency neutral return switch 40 is discriminated by the electronic control device 8 which then discriminates whether or not the shifting operation is normally performed by the gear shift device 12 via the position sensor 22, step S20. At this point, if the shifting operation has been normally performed at a normal position, operation is finished by the electronic control device 8.

As a result of discrimination at step S20, if the electronic control device 8 discriminates that the striker 32 at the gear shift device 12 is not positioned at the normal position, the device 8 controls the magnetic valve assembly 10 to alternatively and repeatedly supply air to cylinders MVA and MVB 26 and 28 at the gear shift device 12 and to simultaneously supply air thereto for provision of shocks to a shift rod 30, step S30.

When the electronic control device 8 discriminates that the striker 32 is positioned at a neutral position through the position sensor 22, the device 8 discriminates that the striker 32 is returned to a neutral position, step S40.

If it is discriminated at the step of S40 that the striker 32 is not positioned at the neutral position even though the magnetic valve assembly 10 is controlled to alternatively and repeatedly supply air to the cylinders MVA and MVB 26 and 28 and to simultaneously supply air thereto for provision of shocks to the shift rod 30, air supply thus described in again repeated.

As apparent from the foregoing, there is an advantage in the neutral returning control system and method for electronic pneumatic shift device according to the present invention thus described in that a neutral return of a striker is enabled in emergency to thereby increase stability to a running vehicle. There is another advantage in that an emergency measure can be taken if an erroneous operation happens to a running vehicle, improving a driving convenience to a driver and maintenance thereof.

What is claimed is:

1. A neutral returning control system for electronic pneumatic shift device, the electronic pneumatic shift device including a change lever position sensor for detecting a manipulation of a change lever, a magnetic valve assembly for controllably supplying air according to a signal from the change lever position sensor, a gear shift device actuated by the air supplied via an air pipe connected to the magnetic valve assembly, a shift stage position sensor disposed at one side for detecting an operation of the gear shift device, and an electronic control device for discriminating electrical signals from the shift stage position sensor, and the change lever position sensor and for controlling the magnetic valve assembly, wherein the system comprises an emergency neutral return switch electrically mounted for allowing the electronic control device to discriminate the turn-on manipulation by a driver when there occurs an erroneous shifting.

2. A neutral returning control method for electronic pneumatic shift device, the method comprising the steps of:
   detecting that an emergency neutral return switch is turned on while a vehicle is running (step S10);
   discriminating a normal position of a striker at a gear shift device by way of a position sensor (step S20);
   sending a command that air is supplied to a cylinder MVA and another cylinder MVB at the gear shift device for the first and second predetermined times (step S30); and
   discriminating a neutral position of the striker at the gear shift device by way of the position sensor (step S40).

3. The method as defined in claim 2, wherein air supplying step further comprises the steps of alternatively and repeatedly supplying air to the cylinders MVA and MVB at the gear shift device for the first predetermined time and again supplying the air to the cylinders for the second predetermined time.

4. The method as defined in claim 2, wherein the electronic control device finishes the operation when it is discriminated by the position sensor that the striker is positioned at a normal position where the striker of the gear shift device is accurately positioned at each shift position or at the neutral position.

5. The method as defined in claim 2, wherein flow returns to a step where air is supplied to the cylinders MVA and MVB of the magnetic valve assembly when it is discriminated by the position sensor that the striker of the gear shift device is not positioned at the neutral position.

6. The method as defined in claim 3, wherein the first predetermined time is set up at 5 seconds.

7. The method as defined in claim 3, wherein the alternative and repeated supply of air is set up at 10 times.

8. The method as defined in claim 3, wherein the second predetermined time is set up at 1 second.

* * * * *